US012755200B2

(12) United States Patent
Fatakdawala et al.

(10) Patent No.: US 12,755,200 B2
(45) Date of Patent: Oct. 6, 2026

(54) METHOD AND SYSTEM FOR INTERPRETING MACHINE LEARNING MODEL'S PREDICTION

(71) Applicant: Tata Consultancy Services Limited, Mumbai (IN)

(72) Inventors: Mustafa Joherbhai Fatakdawala, Mumbai (IN); Kavita Suresh Parab, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 809 days.

(21) Appl. No.: 18/188,150

(22) Filed: Mar. 22, 2023

(65) Prior Publication Data

US 2023/0306308 A1 Sep. 28, 2023

(30) Foreign Application Priority Data

Mar. 23, 2022 (IN) ............................ 202221016247

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

PUBLICATIONS

Robnik-Šikonja et al., 'Explaining Classifications for Individual Instances', 2008, 1-9, Retrieved using IEEE from the Internet: <URL: https://ieeexplore.ieee.org/document/4407709> (Year: 2008).*
Breiman et al., 'Random Forests', 2001, 5-32, Retrieved using springer from the Internet: <URL:https://link.springer.com/article/10.1023/a:1010933404324> (Year: 2001).*
Moradi, Milad et al., "Post-hoc explanation of black-box classifiers using confident item sets", Machine Learning, Date: Sep. 2010, Publisher: Arxiv, https://arxiv.org/ftp/arxiv/papers/2005/2005.01992.pdf.

(Continued)

*Primary Examiner* — Kakali Chaki
*Assistant Examiner* — Ibrahim Rahman
(74) *Attorney, Agent, or Firm* — Finnegan, Henderson, Farabow, Garrett & Dunner LLP

(57) ABSTRACT

This disclosure relates to field of machine learning. The outcome of the ML model translates to economic damage for a business. While the risk associated with outcome of ML model can be mitigated by interpreting/explanation each prediction of the ML model, interpreting ML models is challenging as ML models are built in dynamically changing complex mathematical design. The disclosure is a technique for interpreting machine learning model's prediction by computing a percentage contribution of each of the predictors. The percentage contribution indicates an importance of each of the predictors during prediction by the ML model. The percentage contribution is computed in several steps using several parameters associated with the ML Model including a pre-defined threshold of the ML model, an input feature vector comprising a plurality of predictors, an original prediction (N) for each predictor, a pre-determined duplication factor, and a plurality of pre-trained data statistics.

9 Claims, 4 Drawing Sheets

(56) References Cited

PUBLICATIONS

Petsiuk, Vitali et al., "RISE: Randomized Input Sampling for Explanation of Black-box Models", Computer Vision and Pattern Recognition, Date: Sep. 2018, Publisher: Arxiv, https://arxiv.org/pdf/1806.07421.pdf.
Zafar. Muhammad Rehman et al., "DLIME: A Deterministic Local Interpretable Model-Agnostic Explanations Approach for Computer-Aided Diagnosis Systems", Machine Learning, Date: Jun. 2019, Publisher: Arxiv, https://arxiv.org/pdf/1908.10263.pdf.
Evans, Benjamin P. et al., "What's inside the black-box? A genetic programming method for interpreting complex machine learning models", Conference: the Genetic and Evolutionary Computation Conference, Date: Jul. 2019, pp. 1012-1020, Publisher: ACM, https://www.researchgate.net/publication/334216923_What's_inside_the_black-box_a_genetic_programming_method_for_interpreting_complex_machine_learning_models/link/5e40ba2192851c71712bc2d2/download.

* cited by examiner

METHOD AND SYSTEM FOR INTERPRETING MACHINE LEARNING MODEL'S PREDICTION

PRIORITY CLAIM

This U.S. patent application claims priority under 35 U.S.C. § 119 to: India Application No. 202221016247, filed on Mar. 23, 2022. The entire contents of the aforementioned application are incorporated herein by reference.

TECHNICAL FIELD

The disclosure herein generally relates to the field of Machine learning models, and, more particularly, to a method and a system for interpreting machine learning model's prediction.

BACKGROUND

With the advancement of digital technology, modern data centers and computing environments of several applications such as retail, banking, finance, insurance and research generate significant volumes of machine-generated data. The machine generated data is analyzed for several purposes including predictive analytics. The predictive analytics uses Machine learning (ML) techniques and has been expanding exponentially due to its efficient performance because of advancement in computing power.

The ML techniques utilize ML models for predictive analysis, wherein the several state-of-the-art ML models that are currently available, work on dynamic complex mathematical design. Since business aligned machine-generated data is utilized for predictive analytics, there is risk associated with each prediction of ML, as an issue with the outcome of the ML model can translate to economic damage to the business. The risk can be mitigated by interpreting/explanation each prediction of the ML model. However, interpreting ML models is challenging as ML models are built in dynamically changing complex mathematical design.

Several techniques are available to analyze/interpret the machine-generated data predicted by the ML models. However, the existing techniques for interpreting ML model use static mathematical functions learnt during the model training process, hence making the existing techniques not very reliable for real-time data. Further, a few other techniques create simple, linear models surrogate models or white box model of the ML model to interpret the ML model, which may also not be accurate as the white boxes do not consider the threshold cut off of the ML model nor does it use the static mathematical functions learnt during the model training process or the training data.

SUMMARY

Embodiments of the present disclosure present technological improvements as solutions to one or more of the above-mentioned technical problems recognized by the inventors in conventional systems. For example, in one embodiment, a method for interpreting machine learning model's prediction is provided. The system includes a memory storing instructions, one or more communication interfaces, and one or more hardware processors coupled to the memory via the one or more communication interfaces, wherein the one or more hardware processors are configured by the instructions to receive a plurality of input data parameters associated with a Machine Learning (ML) model, via one or more hardware processors, wherein the plurality of input data parameters includes a pre-defined threshold of the ML model, an input feature vector comprising a plurality of predictors, an original prediction for each predictor from the plurality of predictors, a pre-determined duplication factor, and a plurality of pre-trained data statistics. The system is further configured to create a plurality of duplicate data set of the input feature vector, via the one or more hardware processors, wherein the plurality of duplicate data set is created using the plurality of predictors based on the pre-determined duplication factor. The system is further configured to compute a contribution factor for each predictor in the duplicate data set, via the one or more hardware processors, wherein the process of computing the contribution factor for each predictor in the duplicate data set comprises: replacing the predictor in each duplicate data set in the plurality of duplicate data set with a set of random values to obtain the plurality of estimator data set using the plurality of pre-trained data statistics; obtaining a prediction probability for each of the duplicate data sets using the ML model; predicting a final prediction for each of the duplicate data sets based on the prediction probability and the pre-defined threshold of the ML model; and computing the contribution factor for the predictor using the final predictions of the duplicate data set and the original prediction of the predictor. The system is further configured to interpret the ML model by computing a percentage contribution of each of the predictors, via the one or more hardware processors, using the contribution factor of the plurality of predictors, wherein the percentage contribution indicates an importance of each of the predictors during prediction by the ML model.

In another aspect, a method for interpreting machine learning model's prediction is provided. The method includes receiving a plurality of input data parameters associated with a Machine Learning (ML) model, wherein the plurality of input data parameters includes a pre-defined threshold of the ML model, an input feature vector comprising a plurality of predictors, an original prediction (N) for each predictor from the plurality of predictors, a pre-determined duplication factor, and a plurality of pre-trained data statistics. The method further includes creating a plurality of duplicate data set of the input feature vector, wherein the plurality of duplicate data set is created using the plurality of predictors based on the pre-determined duplication factor. The method further includes computing a contribution factor for each predictor in the duplicate data set, wherein the process of computing the contribution factor for each predictor in the duplicate data set comprises: replacing the predictor in each duplicate data set in the plurality of duplicate data set with a set of random values to obtain the plurality of estimator data set using the plurality of pre-trained data statistics, obtaining a prediction probability for each of the duplicate data sets using the ML model, predicting a final prediction (FP) for each of the duplicate data sets based on the prediction probability and the pre-defined threshold of the ML model and computing the contribution factor (CF) for the predictor using the final predictions of the duplicate data set and the original prediction of the predictor. The method further includes interpreting the ML model by computing a percentage contribution of each of the predictors, using the contribution factor of the plurality of predictors, wherein the percentage contribution indicates an importance of each of the predictors during prediction by the ML model.

In yet another aspect, a non-transitory computer readable medium for interpreting machine learning model's prediction is provided. The program includes receiving a plurality of input data parameters associated with a Machine Learning (ML) model, wherein the plurality of input data parameters includes a pre-defined threshold of the ML model, an input feature vector comprising a plurality of predictors, an original prediction (N) for each predictor from the plurality of predictors, a pre-determined duplication factor, and a plurality of pre-trained data statistics. The program further includes creating a plurality of duplicate data set of the input feature vector, wherein the plurality of duplicate data set is created using the plurality of predictors based on the pre-determined duplication factor. The program further includes computing a contribution factor for each predictor in the duplicate data set, wherein the process of computing the contribution factor for each predictor in the duplicate data set comprises: replacing the predictor in each duplicate data set in the plurality of duplicate data set with a set of random values to obtain the plurality of estimator data set using the plurality of pre-trained data statistics, obtaining a prediction probability for each of the duplicate data sets using the ML model, predicting a final prediction (FP) for each of the duplicate data sets based on the prediction probability and the pre-defined threshold of the ML model and computing the contribution factor (CF) for the predictor using the final predictions of the duplicate data set and the original prediction of the predictor. The program further includes interpreting the ML model by computing a percentage contribution of each of the predictors, using the contribution factor of the plurality of predictors, wherein the percentage contribution indicates an importance of each of the predictors during prediction by the ML model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
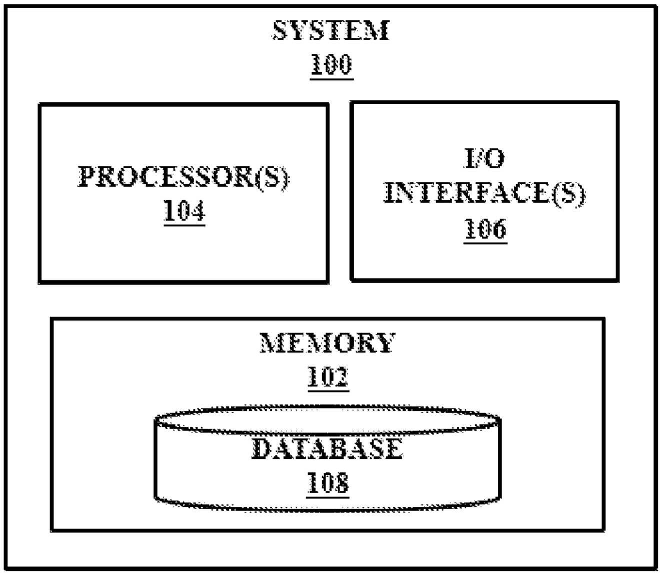
FIG. 1 illustrates an exemplary system for interpreting machine learning model's prediction according to some embodiments of the present disclosure; and FIGS. 2A, FIG. 2B

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Predictive analytics has been exponentially expanding due to advancement in computing power. However, it's necessary to provide justification to every prediction as business applications that use the predictive analysis will be adversely impacted in case of any faulty prediction. The interpretation of the ML model is challenging specially in the dynamically changing complex mathematical design. Further it is also important to consider the changes in the cut-off value while analyzing/interpreting the ML model. In an example scenario, consider a ML model created by a data scientist. The Algorithms while learning from the dataset will arrive at a mathematical function to approximate the underlying the data. Further, the using the mathematical function is utilized by the model to score each prediction and provide a confidence score which is the probability of the prediction being an event (for e.g. Fraudulent transaction, Credit Default, Customer will Churn etc.). Finally, the ML model provides a Boolean value like "1" or "0" to classify each prediction based on a pre-defined threshold, wherein the pre-defined threshold also called as model threshold is defined using various statistical techniques.

Now considering two scenarios in a banking application to determine fraud transaction wherein the same testing data, but different pre-defined thresholds are considered. In the banking application, a transaction is predicted as fraud or non-fraud based on the pre-defined threshold, wherein the test data exceeding or equal to pre-defined threshold is considered as fraud while the test data less than the pre-defined threshold is considered as non-fraud.

In the first scenario, when the pre-defined threshold is defined as 0.4, the test data more or equal to 0.4 is considered as fraud while the test data less than the pre-defined threshold is considered as non-fraud, hence the prediction out of 100 data may have 10 fraud and 90 non-fraud based on comparison with the pre-defined threshold.

In the second scenario, when the pre-defined threshold is defined as 0.2, the test data more or equal to 0.2 is considered as fraud while the test data less than to pre-defined threshold is considered as non-fraud, hence the prediction out of 100 data may have 30 fraud and 70 non-fraud based on comparison with the pre-defined threshold.

Therefore, by selecting different pre-defined thresholds, a given transaction classification is changed from Fraud to Non-Fraud and vice versa but the explanation does not change accordingly based on the first and the second scenarios. Hence, it can be inferred that the prediction is dependent on the pre-defined threshold, which is dynamically decided for each parameter. Hence to interpret an ML model, it is mandatory to consider the parameters, and their importance along with the pre-defined threshold.

Figure 2A:
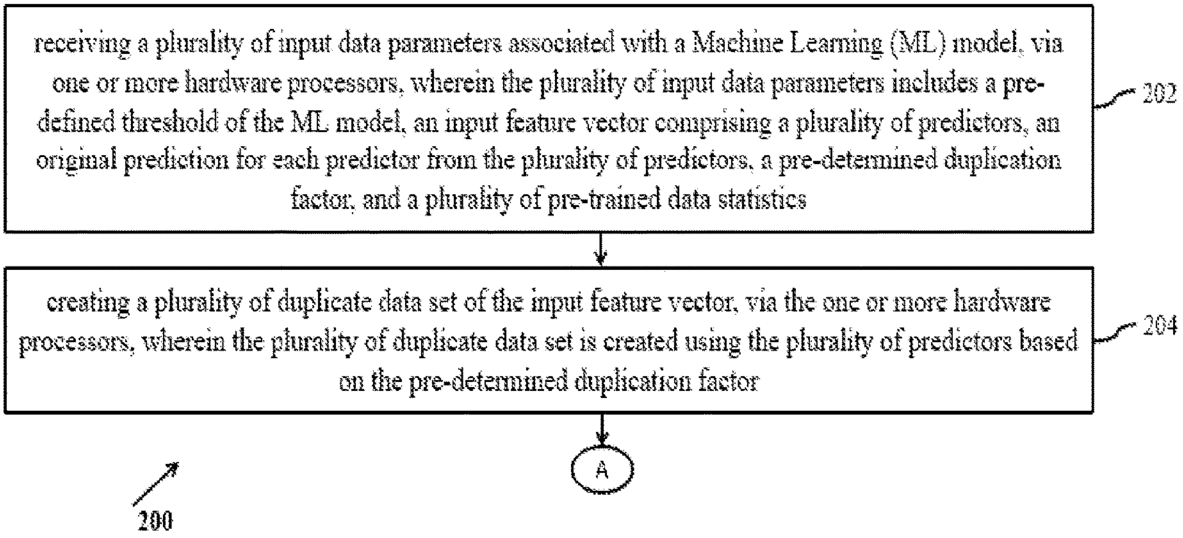
FIG. 2C is a flow diagram illustrating a method (200) for interpreting machine learning model's prediction in accordance with some embodiments of the present disclosure.
Figure 2B:
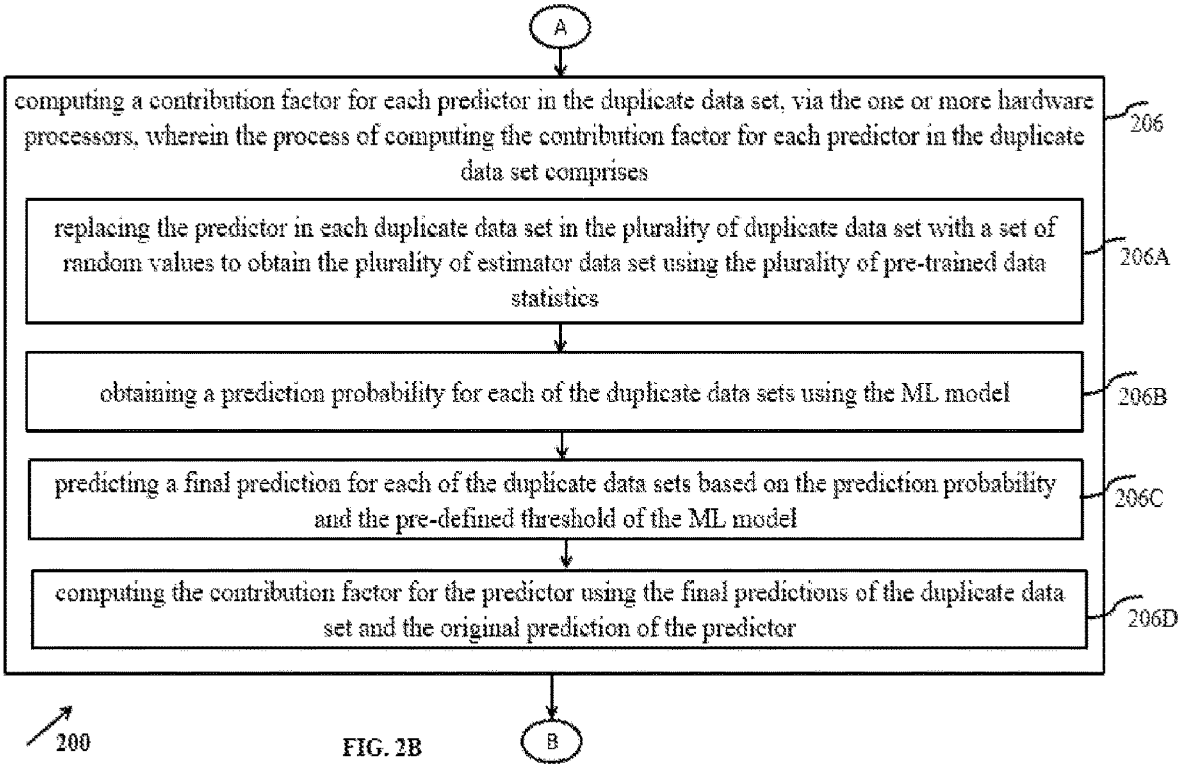
Figure 2C:
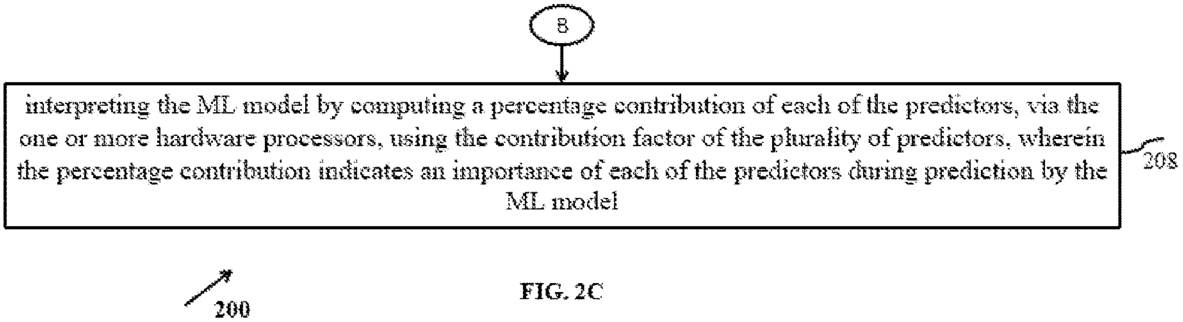

Referring now to the drawings, and more particularly to FIG. 1 through FIG. 2C, where similar reference characters denote corresponding features consistently throughout the figures, there are shown preferred embodiments and these embodiments are described in the context of the following exemplary system and/or method.

FIG. 1 is an exemplary block diagram of a system 100 for interpreting machine learning model's prediction in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding several ML models and working of the ML models using complex mathematical designs. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Functions of the components of system 100 are explained in conjunction with the method explained using the flow diagram of FIG. 2 for interpreting machine learning model's prediction.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

The various modules of the system 100 are configured for interpreting machine learning model's prediction and are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 100 are explained in conjunction with flow diagram of FIG. 2A, FIG. 2B and FIG. 2C. The FIG. 2A, FIG. 2B and FIG. 2C with reference to FIG. 1, is an exemplary flow diagram illustrating a method 200 for interpreting machine learning model's prediction using the system 100 of FIG. 1 according to an embodiment of the present disclosure.

The steps of the method of the present disclosure will now be explained with reference to the components of the system (100) for interpreting machine learning model's prediction as depicted the flow diagrams as depicted in FIG. 2A, FIG. 2B and FIG. 2C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method (300) a plurality of input data parameters associated with a Machine Learning (ML) model is received using the one or more hardware processors 104.

The plurality of input data parameters includes a pre-defined threshold of the ML model, an input feature vector comprising a plurality of predictors, an original prediction for each predictor from the plurality of predictors, a pre-determined duplication factor, and a plurality of pre-trained data statistics.

In an embodiment, the Machine Learning (ML) model is interpreted using the disclosed techniques for either (a) prediction or for (b) inference explanation. The disclosed techniques are utilized to understand the reason behind the prediction or interpretation for the input data by the ML model. The disclosed technique can be used for several ML models including a Decision Tree, a Logistic regression, a Random Forest, a Gradient Boosted Trees, an Extreme Gradient Boosting (XGBOOST), a Gaussian Naive Bayes, a K nearest neighbors Classifier, a Stochastic Gradient Decent Classifier, a AdaBoost Classifier, a Multilayer Perceptron Classifier, and a Support Vector Machines.

In an embodiment, the input feature vector comprises a plurality of predictors. The input feature vector is similar to a table and the plurality of predictors are the column of the table, an example of the input feature vector is as shown in table. 1 below:

TABLE 1

| Input feature vector | | | |
|---|---|---|---|
| Predictor 1 | Predictor 2 | Predictor 3 | Original Prediction |
| X1 | X2 | X3 | 1 |

Considering an example scenario of an insurance application, data related to a claim initiated for an accident is an input feature vector and the plurality of predictors are columns storing details regarding the claim and the person who has initiated the claim including predictors such as a TRANSACTION_ID (Unique transaction ID), a CUSTOMER_ID (Unique Customer ID), a POLICY_NUMBER (Insurance Policy Number), a POLICY_EFF_DT (Policy Effective date), a LOSS_DT (Date when Loss or Incident happened), a REPORT_DT (Date on which the Loss or Incident was reported), an INSURANCE_TYPE (Type of Insurance Product e.g. Life, motor, health etc.), a PREMIUM AMOUNT (Premium Amount paid in $), a CLAIM_AMOUNT (The Claim Amount in $), a CUSTOMER_NAME (Name of the customer), a CUSTOMER_ADDRESS (Address of customer), and a CLAIM_STATUS (Status of the Claim).

In an embodiment, an original prediction (OP) for each predictor from the plurality of predictors is a prediction as predicted by the ML model. The ML model has in-built techniques provide a "confidence score" that indicates a prediction probability, for example: considering the example scenario of an insurance application the ML model is trained to predict if the transaction is a "fraud" or "not a fraud".

In an embodiment, the pre-determined duplication factor (n) is pre-determined by a data scientist who has designed the ML model. The pre-determined duplication factor is determined based on several factors including a user requirement for real-time/offline prediction, availability of Central Processing Unit (CPU) and Random Access Memory (RAM). In an example scenario, the pre-determined duplication factor is determined as 5000.

In an embodiment, the plurality of pre-trained data statistics is a plurality of historic data available for the same field as the input feature vector. The is utilized to generate valid duplicate data for the input feature vector. In an example scenario, "Age" is one of the predictors in insurance domain, wherein the plurality of pre-trained data statistics for age will be defined as between 18 to 80.

At step 204 of the method (200), a plurality of duplicate data set is created via the one or more hardware processors 104. The plurality of duplicate data set is created for the input feature vector based on the pre-determined duplication factor.

In an example scenario, considering pre-determined duplication factor as 5000, the plurality of duplicate data set created for the input feature vector (as shown in Table. 1) is shown below in table 2:

TABLE 2

The plurality of duplicate data set.

| Pre-determined duplication factor. | Predictor 1 | Predictor 2 | Predictor 3 |
|---|---|---|---|
| 1 | X1 | X2 | X3 |
| 2 | X1 | X2 | X3 |
| 3 | X1 | X2 | X3 |
| ... | ... | ... | ... |
| 5000 | X1 | X2 | X3 |

At step 206 of the method (200), a contribution factor for each predictor in the duplicate data set is computed, via the one or more hardware processors 104. The process of computing the contribution factor for each predictor in the duplicate data set is explained using the steps 206A-206D and are explained below.

At step 206A of the method (200), the predictor in each duplicate data set in the plurality of duplicate data set is replaced with a set of random values to obtain the plurality of estimator data set. The set of random values is obtained using the plurality of pre-trained data statistics.

In an example scenario, considering the predictor 1 in the duplicate data set (Table 2) is replaced with a set of random values (R1 to R500) to obtain the plurality of estimator data set is shown below in table 3:

TABLE 3

The plurality of estimator data set.

| pre-determined duplication factor. | Predictor 1 | Predictor 2 | Predictor 3 |
|---|---|---|---|
| 1 | R1 | X2 | X3 |
| 2 | R2 | X2 | X3 |
| 3 | R3 | X2 | X3 |
| ... | ... | ... | ... |
| 5000 | R5000 | X2 | X3 |

At step 206B of the method (200), a prediction probability is obtained for each of the duplicate data sets using the ML model.

In an embodiment, the ML model has in-built techniques to provide a "confidence score" that indicates a prediction probability, for example: considering an example scenario of an insurance application, the ML model is trained to predict if the transaction is a "fraud" or "not a fraud".

Table. 4 depicts calculation of the prediction probability in an example scenario:

TABLE 4

Prediction probability

| pre-determined duplication factor. | Predictor 1 | Predictor 2 | Predictor 3 | Prediction Probability |
|---|---|---|---|---|
| 1 | R1 | X2 | X3 | P1 |
| 2 | R2 | X2 | X3 | P2 |
| 3 | R3 | X2 | X3 | P3 |
| ... | ... | ... | ... | ... |
| 5000 | R5000 | X2 | X3 | P5000 |

At step 206C of the method (200), a final prediction (FP) is predicted for each of the duplicate data sets. The final prediction is predicted based on the prediction probability and the pre-defined threshold of the ML model, where in the ML model used is a binary classifier.

In an embodiment, the final prediction comprises one of a first pre-defined value and a second pre-defined value. The final prediction is predicted as the first pre-defined value for prediction probability equal or higher than the pre-defined threshold. Further, the final predication is predicted as the second pre-defined value for prediction probability lower than the pre-defined threshold.

In an example scenario, the first pre-defined value and a second pre-defined value are the predictions by the ML model and includes values such as "Yes/No", "0/1", "Positive/Negative", "Approve/Decline".

Considering the table 4, the final prediction is determined based on a comparison with the pre-defined threshold, wherein if the value of the final prediction probability is greater than equal to the pre-defined threshold, then the records are marked as 1. Further, if the prediction probability is lesser than to the pre-defined threshold then the records is marked as 0. Example calculation of values of the final prediction is depicted in Table. 5.

TABLE 5

| Final prediction | | | | | |
|---|---|---|---|---|---|
| pre-determined duplication factor. | Predictor 1 | Predictor 2 | Predictor 3 | Prediction Probability | Final prediction |
| 1 | R1 | X2 | X3 | P1 | 1 |
| 2 | R2 | X2 | X3 | P2 | 0 |
| 3 | R3 | X2 | X3 | P3 | 0 |
| . . . | . . . | . . . | . . . | . . . | . . . |
| 5000 | R5000 | X2 | X3 | P5000 | 1 |

At step 206D of the method (300), the contribution factor is computed for the predictor. The contribution factor is computed using the final predictions (FP) of the duplicate data set, the original prediction (OP) of the predictor and the pre-determined duplication factor (N).

In an embodiment, the contribution factor for each predictor in a binary classifier (ML model) is computed based on the pre-determined duplication factor (N) for each predictor, the original prediction (OP) of the predictor and the final prediction (FP), wherein the contribution factor for a binary classifier is expressed as:

$$CF_i = \frac{\left|(N * OP) - \sum_{n=1}^{N} FP_n\right|}{N} \quad (1)$$

In an example scenario, if original prediction (OP) of the predictor of the ML model is 1, the duplicate data set predicted with the first pre-defined value (1) is 2300, the duplicate data set predicted with the second pre-defined value (0) is 2700, then the change is due to predictor 1 (which defines the importance of the predictor 1) that is the contribution factor is computed as shown below:

$$CF_i = \frac{|5000 * 1 - (2300)|}{(5000)} = 0.54$$

The process of 206A to 206D is performed for all the predictors in the input feature vector, wherein the contribution factor is determined for all the predictors.

In an example scenario, of the input feature vector of table. 1, the contribution factor is computed for all the three predictors as described in steps 206A to 206D and is illustrated as shown below:

TABLE 6

| contribution factor determined for all the predictors in the input feature vector | |
|---|---|
| Predictor of the input feature vector | Contribution factor |
| Predictor 1 | 0.54 |
| Predictor 2 | 0.30 |
| Feature 3 | 0.04 |

At step 208 of the method (200), a percentage contribution is computed for each of the predictors, via the one or more hardware processors 104. The percentage contribution indicates importance of each of the predictors during ML predictions for the given ML model.

The percentage contribution is the computed using the contribution factor of the plurality of predictors. the percentage contribution is expressed using the equation:

$$PC_i = \frac{CF_i}{\sum_{i=1}^{n} CF_i} \quad (2)$$

In an example scenario, considering the input feature vector of table. 1 and the contribution factors computed as illustrated in Table. 6, then the percentage contribution is the computed using the contribution factor of the plurality of predictors and is expressed as shown below:

$$PC_i \text{ of predictor } 1 = \frac{0.54}{0.54 + 0.3 + 0.04} = 61.36\%$$

Based on the method 200, the percentage contribution is the computed for all the predictors of the input feature vector. Using the percentage contribution of each predictor the user can arrive the conclusion of the importance of each of the predictors during ML predictions for the given ML model. Based on the importance of each of the predictors, the user can conclude/identify the predictors that has the most/least importance during predictions and steer the business decisions.

Experiments

An experiment has been conducted for a banking application—credit card transaction data to predict fraudulent transaction for Master Card 3DS secured card portfolio. To analyze the alignment of prediction with business justification for each method, transaction level data for credit card is used as shown below:

Period: 3 months (May-July 2019)

Train Test Split is 70% (Train) and 30% (Test)

The ML model was built using 25 Features on an open-source training dataset.

Explain ability validation was carried out on open source training dataset shown are below:

Overall transaction volume of the test data set—37,375

Fraud transaction volume in the test data set—880

Fraud rate in the test dataset—2.4%

Among the various machine learning algorithms explored on the open-source training dataset, the random forest model was finalized based on performance evaluation. Below is performance on 30% Test dataset. The original prediction (N) for each predictor would be selected as one of the below:

True Negative[A]: The Transaction was "Not a Fraud" and the Machine Learning model predicted it as "Not a Fraud"

True Positive[B]: The Transaction was "Fraud" and the Machine Learning model predicted it as "Fraud"

False Positive[C]: The Transaction was "Not a Fraud" and the Machine Learning model predicted it as "Fraud"

False Negative[D]: The Transaction was "Fraud" and the Machine Learning model predicted it as "Not a Fraud"

Sensitivity: It is defined as the ratio of True Positive[B] divided by sum of True Positive[B] and False Negative [D]

$$\text{Sensitivity}=B/(B+D)$$

Sensitivity indicates the ratio of fraudulent transaction correctly identified by the ML Solution Specificity: is defined as the ratio of True Negative[A] divided by sum of True Positive[A] and False Positive [C]

$$\text{Specificity} = A/(A+C)$$

Specificity indicates the ratio of non-fraudulent transaction correctly identified by the ML Solution Precision: is defined as ratio of True Positive[B] divided by sum of True Positive[B] and False Positive[C]

$$\text{Precision} = B/(B+C)$$

Accuracy: is defined as the ratio of correctly identified transaction divided by the total number of transactions Accuracy=(True Positive+True Negative)/(True Positive+True Negative+False Positive+False Negative)

False Positive Ratio: is defined as the ratio of False Positive[C] divided by True Positive[B]

$$\text{False Positive Ratio} = C/B$$

40 random transactions were selected from above prediction from positives (20 from each, B and C) and 40 random transactions from negatives (20 from each, A and D) and applied to the disclosed technique. For experimentation purposes: Positives means the transaction which are predicted as Fraudulent by the ML model, and Negative means the transaction which are predicted as Non-Fraudulent by the ML model.

For experimentation purposes the inputs received by the disclosed system and method is shared below:

The pre-defined threshold of the ML model: 0.12

The pre-determined duplication factor: 5000

Size of input feature vector: 25

Machine Learning Algorithms: RandomForestClassifier

For comparison purposes the disclosed invention was compared with several existing state-of-art techniques including a local interpretable model-agnostic explanations (LIME), a Shapley Additive explanations (SHAP) and a ELI5. The LIME is a technique that approximates any black box machine learning model with a local, interpretable model to explain each individual prediction, the SHAP is a game theoretic approach to explain the output of any machine learning model that connects optimal credit allocation with local explanations using the classic Shapley values from game theory and the ELI5 is a python package used to inspect ML classifiers and explain their predictions. It is popularly used to debug algorithms such as sklearn regressors and classifiers, XGBoost, CatBoost, etc.

The 80 random transactions (40 positives & 40 Negatives) are also input to disclosed method and 3 open-source solution (LIME, SHAP & ELI5) and ML prediction explainable output was produced as below:

TABLE 7

Random transactions

| Predictor | Value of the Predictor | Contribution factor | Percentage contribution |
|---|---|---|---|
| Feature_17 | 957 | 0.17 | 15.88 |
| Feature_4 | 0 | 0.1 | 9.12 |
| Feature_8 | 7.43 | 0.1 | 9.08 |
| Feature_11 | 7.43 | 0.08 | 7.76 |
| Feature_15 | 0.13 | 0.08 | 7.3 |
| Feature_2 | 1 | 0.08 | 7.2 |
| Feature_16 | 0.01 | 0.07 | 6.64 |
| Feature_22 | 0.13 | 0.05 | 4.58 |
| Feature_12 | 1 | 0.04 | 3.69 |
| Feature_3 | 0.07 | 0.04 | 3.29 |
| Feature_6 | 0.94 | 0.03 | 2.81 |
| Feature_21 | 0.13 | 0.03 | 2.75 |
| Feature_1 | 0.94 | 0.03 | 2.72 |
| Feature_23 | 857 | 0.03 | 2.72 |
| Feature_18 | 0.05 | 0.03 | 2.68 |
| Feature_10 | 3 | 0.03 | 2.29 |
| Feature_13 | 0 | 0.02 | 1.84 |
| Feature_5 | 1 | 0.02 | 1.82 |
| Feature_20 | 75.98 | 0.02 | 1.75 |
| Feature_9 | 76.92 | 0.01 | 1.19 |
| Feature_14 | 18.23 | 0.01 | 0.91 |
| Feature_19 | 75.98 | 0.01 | 0.91 |
| Feature_25 | 76.92 | 0.01 | 0.56 |
| Feature_24 | 1 | 0 | 0.46 |
| Feature_7 | 17 | 0 | 0.06 |

Note:
Input Feature-The 25 features on which the model was built
Feature Value-The values of each feature or column
Feature Contribution-The contribution of feature
Percentage Feature Contribution-The percentage contributions of the feature Validation: Each prediction and corresponding explanation for each algorithm is manually validated to confirm alignment towards business justification is as shown below:

TABLE 8

Prediction of ML

| | Total | Disclosed technique | | LIME | | SHAP | | Eli5 | |
|---|---|---|---|---|---|---|---|---|---|
| Positives | 40 | 34 | 85.00% | 38 | 95.00% | 38 | 95.00% | 15 | 37.50% |
| Negatives | 40 | 31 | 77.50% | 15 | 37.50% | 19 | 47.50% | 33 | 82.50% |

Overall Comparison:

TABLE 9

Comparison between disclosed and existing state-of-art techniques

| Methodology | Percentage Observation correctly explained |
|---|---|
| Disclosed technique | 81.25% |
| LIME | 66.25% |
| SHAP | 71.25% |
| ELI5 | 60% |

From the above experimentation, it can be inferred that LIME and SHAP methods are very good in explaining positive prediction whereas ELI5 can explain negative predictions in a better way. However, the disclosed techniques show stable performance on both positive and negative predictions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a solution for interpreting machine learning model's prediction. The outcome of the ML model can translate to economic damage for a business and the risk associated with outcome of ML model can be mitigated by interpreting/explanation each prediction of the ML model. However, interpreting ML models is challenging as ML models are built in dynamically changing complex mathematical design. The disclosure is a technique for interpreting machine learning model's prediction. The disclosed technique interprets ML model's prediction by computing a percentage contribution of each of the predictors, wherein the percentage contribution indicates an importance of each of the predictors during prediction by the ML model. The percentage contribution is computed in several steps using several parameters associated with the ML Model including a pre-defined threshold of the ML model, an input feature vector comprising a plurality of predictors, an original prediction (N) for each predictor, a pre-determined duplication factor, and a plurality of pre-trained data statistics.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for interpreting machine learning model's prediction comprising:

receiving a plurality of input data parameters associated with a Machine Learning (ML) model, via one or more hardware processors, wherein the plurality of input data parameters includes a pre-defined threshold of the ML model, an input feature vector comprising a plurality of predictors, an original prediction (N) for each predictor from the plurality of predictors, a pre-determined duplication factor, and a plurality of pre-trained data statistics;

creating a plurality of duplicate data set of the input feature vector, via the one or more hardware processors, wherein the plurality of duplicate data set is created using the plurality of predictors based on the pre-determined duplication factor;

computing a contribution factor for each predictor in the duplicate data set, via the one or more hardware processors, wherein the process of computing the contribution factor for each predictor in the duplicate data set comprises:

replacing the predictor in each duplicate data set in the plurality of duplicate data set with a set of random values to obtain the plurality of estimator data set using the plurality of pre-trained data statistics;

obtaining a prediction probability for each of the duplicate data sets using the ML model;

predicting a final prediction (FP) for each of the duplicate data sets based on the prediction probability and the pre-defined threshold of the ML model, wherein the final prediction (FP) comprises one of a first pre-defined value and a second pre-defined value, wherein the final prediction is predicted as the first pre-defined value for prediction probability equal or higher than the pre-defined threshold and the final predication is predicted as the second pre-defined value for prediction probability lower than the pre-defined threshold; and computing the contribution factor (CF) for the predictor using the final predictions of the duplicate data set and the original prediction of the predictor; and interpreting the ML model by computing a percentage contribution of each of the predictors, via the one or more hardware processors, using the contribution factor of the plurality of predictors, wherein the percentage contribution indicates an importance of each of the predictors during prediction by the ML model.

2. The method of claim 1, wherein the Machine Learning (ML) model is interpreted for one of prediction and inference explanation, where the ML model includes a Decision Tree, a Logistic regression, a Random Forest, a Gradient Boosted Trees, a Extreme Gradient Boosting (XGBOOST), a Gaussian Naive Bayes, a K nearest neighbors Classifier, a Stochastic Gradient Decent Classifier, a AdaBoost Classifier, a Multilayer Perceptron Classifier and a Support Vector Machines.

3. The method of claim 1, wherein the contribution factor (CF) for each predictor is computed based on the pre-determined duplication factor (N) for each predictor, the original prediction (OP) of the predictor and the final prediction (FP), wherein the contribution factor is expressed as:

$$CF_i = \frac{\left|(N * OP) - \sum_{n=1}^{N} FP_n\right|}{N}.$$

4. The method of claim 1, wherein the percentage contribution is expressed using the equation:

$$PC_i = \frac{CF_i}{\sum_{i=1}^{n} CF_i}.$$

5. A system comprising:

a memory storing instructions;

one or more communication interfaces; and one or more hardware processors coupled to the memory via the one or more communication interfaces, wherein the one or more hardware processors are configured by the instructions to:

receive a plurality of input data parameters associated with a Machine Learning (ML) model, via one or more hardware processors, wherein the plurality of input data parameters includes a pre-defined threshold of the ML model, an input feature vector comprising a plurality of predictors, an original prediction for each predictor from the plurality of predictors, a pre-determined duplication factor, and a plurality of pre-trained data statistics;

create a plurality of duplicate data set of the input feature vector, via the one or more hardware processors, wherein the plurality of duplicate data set is created using the plurality of predictors based on the pre-determined duplication factor;

compute a contribution factor for each predictor in the duplicate data set, via the one or more hardware processors, wherein the process of computing the contribution factor for each predictor in the duplicate data set comprises:

replacing the predictor in each duplicate data set in the plurality of duplicate data set with a set of random values to obtain the plurality of estimator data set using the plurality of pre-trained data statistics;

obtaining a prediction probability for each of the duplicate data sets using the ML model;

predicting a final prediction for each of the duplicate data sets based on the prediction probability and the pre-defined threshold of the ML model, wherein the one or more hardware processors are configured by the instructions to estimate the final prediction, wherein the final prediction comprises one of a first pre-defined value and a second pre-defined value, wherein the final prediction is predicted as the first pre-defined value for prediction probability equal or higher than the pre-defined threshold and the final predication is predicted as the second pre-defined value for prediction probability lower than the pre-defined threshold; and computing the contribution factor for the predictor using the final predictions of the duplicate data set and the original prediction of the predictor; and interpret the ML model by computing a percentage contribution of each of the predictors, via the one or more hardware processors, using the contribution factor of the plurality of predictors, wherein the percentage contribution indicates an importance of each of the predictors during prediction by the ML model.

6. The system of claim 5, wherein the one or more hardware processors are configured by the instructions to obtain the prediction probability for each of the duplicate data set using the ML model, wherein the Machine Learning (ML) model interpreted for prediction/inference explanation includes a Decision Tree, a Logistic regression, a Random Forest, a Gradient Boosted Trees, a Extreme Gradient Boosting (XGBOOST), a Gaussian Naive Bayes, a K nearest neighbors Classifier, a Stochastic Gradient Decent Classifier, a AdaBoost Classifier, a Multilayer Perceptron Classifier and a Support Vector Machines.

7. The system of claim 5, wherein the one or more hardware processors are configured by the instructions to compute the contribution factor, wherein the contribution factor (CF) for each predictor is computed based on the pre-determined duplication factor (N) for each predictor, the original prediction (OP) of the predictor and the final prediction (FP), wherein the contribution factor is expressed as:

$$CF_i = \frac{\left|(N * OP) - \sum_{n=1}^{N} FP_n\right|}{N}.$$

8. The system of claim 5, wherein the one or more hardware processors are configured by the instructions to compute a percentage contribution, wherein the percentage contribution is expressed as shown below:

$$PC_i = \frac{CF_i}{\sum_{i=1}^{n} CF_i}.$$

9. One or more non-transitory machine-readable information storage mediums comprising one or more instructions which when executed by one or more hardware processors cause:

receiving a plurality of input data parameters associated with a Machine Learning (ML) model, via one or more hardware processors, wherein the plurality of input data parameters includes a pre-defined threshold of the ML model, an input feature vector comprising a plurality of predictors, an original prediction for each predictor from the plurality of predictors, a pre-determined duplication factor, and a plurality of pre-trained data statistics;

creating a plurality of duplicate data set of the input feature vector, via the one or more hardware processors, wherein the plurality of duplicate data set is created using the plurality of predictors based on the pre-determined duplication factor;

computing a contribution factor for each predictor in the duplicate data set, via the one or more hardware processors, wherein the process of computing the contribution factor for each predictor in the duplicate data set comprises:

replacing the predictor in each duplicate data set in the plurality of duplicate data set with a set of random values to obtain the plurality of estimator data set using the plurality of pre-trained data statistics;

obtaining a prediction probability for each of the duplicate data sets using the ML model;

predicting a final prediction for each of the duplicate data sets based on the prediction probability and the pre-defined threshold of the ML model, wherein the final prediction (FP) comprises one of a first pre-defined value and a second pre-defined value, wherein the final prediction is predicted as the first pre-defined value for prediction probability equal or higher than the pre-defined threshold and the final predication is predicted as the second pre-defined value for prediction probability lower than the pre-defined threshold; and computing the contribution factor for the predictor using the final predictions of the duplicate data set and the original prediction of the predictor; and interpreting the ML model by computing a percentage contribution of each of the predictors, via the one or more hardware processors, using the contribution factor of the plurality of predictors, wherein the percentage contribution indicates an importance of each of the predictors during prediction by the ML model.

* * * * *